2 Sheets—Sheet 1.

W. S. McKENNA.
Heating-Furnace.

No. 196,534. Patented Oct. 30, 1877.

Witnesses
J. H. Stevenson
J. J. Moore

Inventor
Wm S. McKenna
Atty J. C. Anderson

2 Sheets—Sheet 2.

W. S. McKENNA.
Heating-Furnace.

No. 196,534. Patented Oct. 30, 1877.

Witnesses
J. H. Stevenson
O. T. Moore

Inventor
Wm. S. McKenna
Atty J. C. Anderson

UNITED STATES PATENT OFFICE.

WILLIAM S. McKENNA, OF PITTSBURG, PENNSYLVANIA.

IMPROVEMENT IN HEATING-FURNACES.

Specification forming part of Letters Patent No. 196,534, dated October 30, 1877; application filed October 23, 1876.

*To all whom it may concern:*

Be it known that I, WILLIAM S. McKENNA, of Pittsburg, Pennsylvania, have invented a new and useful Improvement in Heating or Tending Furnaces, which improvement is fully set forth in the following specification, reference being had to the accompanying drawing.

Similar letters of reference indicate corresponding parts.

My invention relates to that class of furnaces known as heating or "tending" furnaces, for heating nail-plates preparatory to cutting the same into nails, and for other like purposes; and the invention, consists, mainly in the novel construction of the flues with relation to the heating-hearth, by which the heat is regulated and maintained at the desired degree with great economy of fuel, obviating the objection, heretofore observed in heating-furnaces, of the sudden cooling of the same when the doors were opened for placing or removing the plates.

Figure 1:
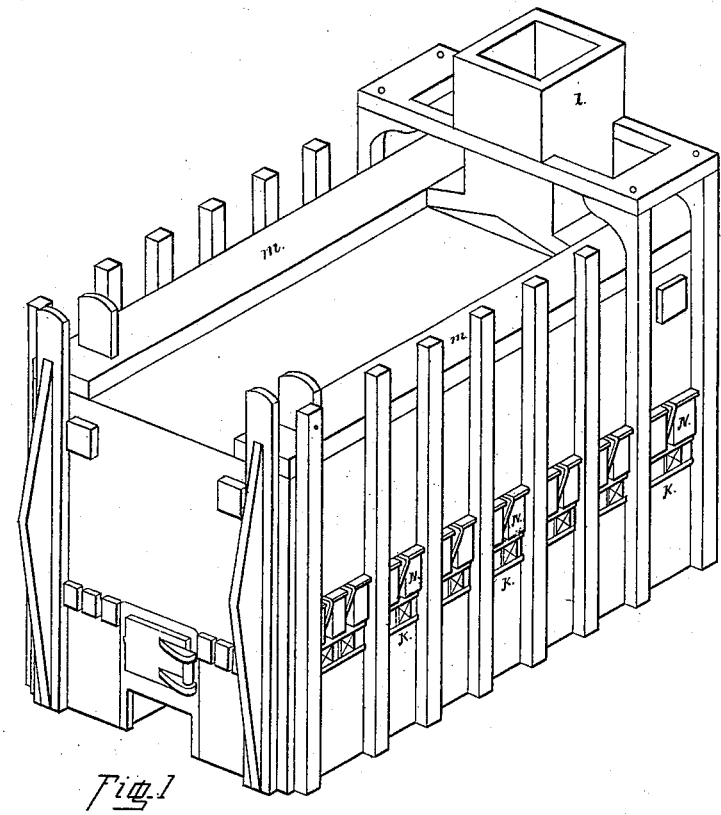
Figure 2:
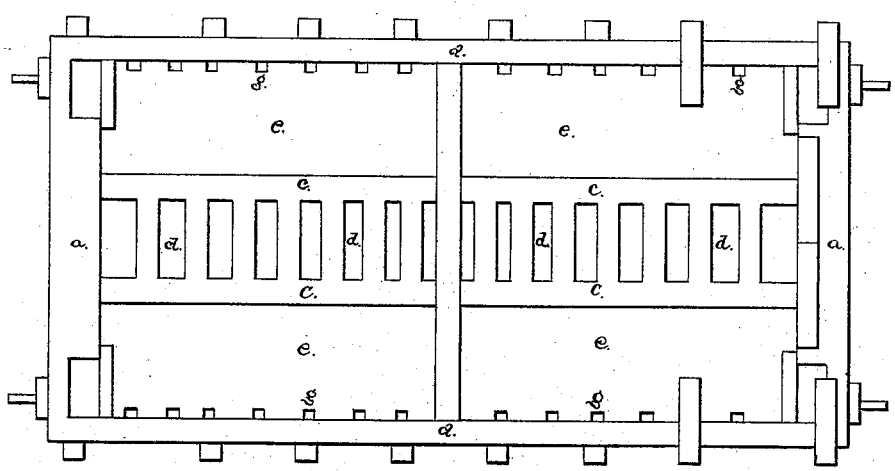
Figure 3:
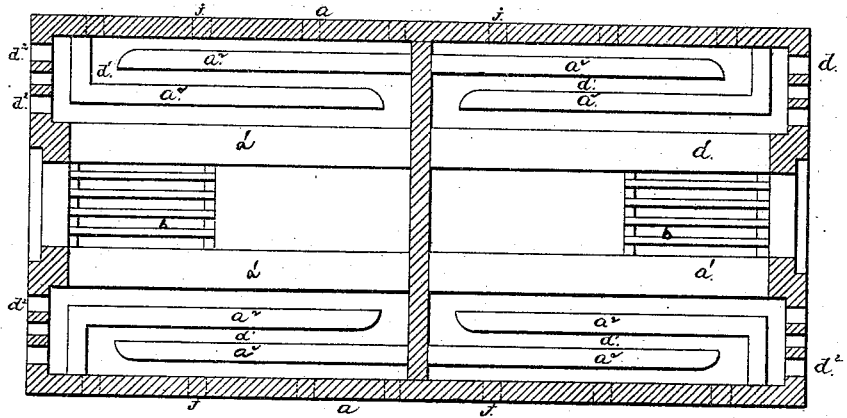
Figure 4:
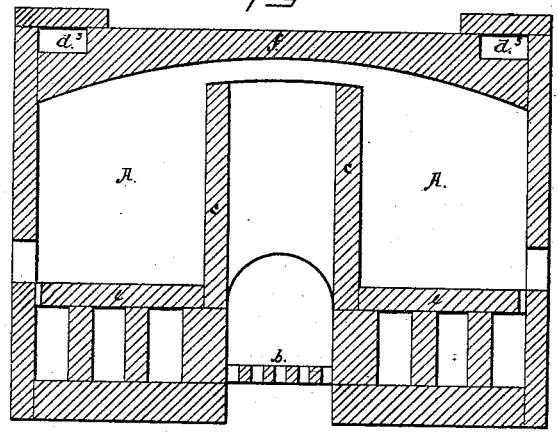
Figure 5:
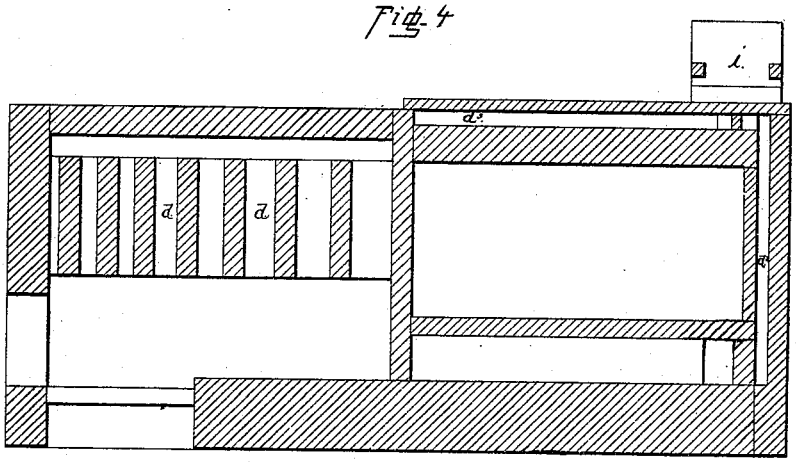

Reference is hereby made to the accompanying drawings, in which Figure 1 is an isometrical perspective view. Fig. 2 is a top view, with the covering-arch removed. Fig. 3 is a plan view, with the heating-hearth removed. Fig. 4 is a vertical transverse section; and Fig. 5 is a view showing longitudinal sections, one through the center of the furnace, and one inside of exterior walls.

A A are the main heating-chambers. $a\,a$ are the surrounding walls of the furnace. $a^1\,a^1$ are the walls of the fire-pit. $b\,b$ are the fire-beds. $c\,c$ are walls forming vertical flues $d\,d$. $e\,e$ are the heating-hearths, formed by tiles or fire-brick. $f$ is the top of the furnace, built in the form of an arch on the under and inner side of the furnace. $g\,g$ are openings in the heating-hearth to the flues $d^1\,d^1$. $a^2\,a^2$ are division-walls, forming, with the walls $a$ and $a^1$, labyrinthical flues $d^1\,d^1$, communicating with the flues $d^2\,d^2$, formed within the side walls $a$ of the furnace. The flues $d^3\,d^3$ are formed at the junction of the top of the side walls $a\,a$ with the top $f$ of the furnace, communicating with the flues $d^2\,d^2$, and leading to the stack $i$. The top covering $m\,m$ of these flues $d^3\,d^3$ are made adjustable for the purpose of admitting air into the flues for regulating the draft. The openings $j\,j$ and doors $k\,k$ are also for regulating the draft of the furnace by the admission of air at that point into the flues.

By the use of the labyrinthical flues $d^1\,d^1$ the heat is brought into contact with the hearths $e\,e$, and by the increased length of the flues the draft is greatly increased.

I now proceed to describe the operation of my furnace.

The caloric rises from the coals, and, by the draft of the flues, is made to pass up, through the flues $d\,d$, against the arch $f$ of the chamber A, and is then made to descend, through the openings $g\,g$, into the flues $d^1\,d^1$, and up through the flues $d^2\,d^2$ and the flues $d^3\,d^3$ to the stack $i$, the draft being regulated, as above stated, by means of the movable tops $m\,m$ of the flues $d^2$, and the openings $j\,j$ and doors $k\,k$. The plates to be heated are placed on the hearths of the furnace through the doors N N.

Having thus described my invention, what I claim, and desire to secure by Letters Patent, is—

1. In a heating or tending furnace, the combination, with the chamber A, the vertical flues $d\,d$, arch $f$, flue-openings $g\,g$, flues $d^1\,d^1$, $d^2\,d^2$, and $d^3\,d^3$, substantially as described and shown.

2. In a heating or tending furnace, the heating-hearths $e$, in combination with the flue $d^1$ beneath the same, flues $d\,d$, chamber A, and the openings $g\,g$, substantially as described and shown.

3. In a heating or tending furnace, the openings $j\,j$ and doors $k\,k$, beneath the heating-hearths, substantially as described and shown.

In testimony that I claim the foregoing as my invention I hereto set my hand, at Pittsburg, Pennsylvania, this 18th day of October, A. D. 1876.

WILLIAM S. McKENNA.

Witnesses:
JOHN H. STEVENSON,
A. H. GREENAWALT.